United States Patent [19]
Brothers et al.

[11] Patent Number: 5,900,053
[45] Date of Patent: May 4, 1999

[54] LIGHT WEIGHT HIGH TEMPERATURE WELL CEMENT COMPOSITIONS AND METHODS

[75] Inventors: Lance E. Brothers, Ninnekah; D. Chad Brenneis, Marlow; Jerry D. Childs, Duncan, all of Okla.

[73] Assignee: Halliburton Energy Services, Inc., Duncan, Okla.

[21] Appl. No.: 08/912,203

[22] Filed: Aug. 15, 1997

[51] Int. Cl.$^6$ ............ C04B 24/12; C04B 24/16; C04B 14/02; C04B 7/345

[52] U.S. Cl. ............ 106/678; 106/679; 106/708; 106/696; 106/808; 106/809; 106/810; 106/823; 106/DIG. 1; 106/820; 166/293; 166/294; 507/203; 507/269; 405/267

[58] Field of Search ............ 106/678, 679, 106/708, 696, 808, 809, 810, 823, DIG. 1, 820; 166/293, 294; 507/203, 269; 405/267

[56] References Cited

U.S. PATENT DOCUMENTS

| | | | |
|---|---|---|---|
| 3,901,316 | 8/1975 | Knapp ............ | 166/250 |
| 4,265,503 | 5/1981 | Tsuda et al. ............ | 106/100 |
| 4,397,354 | 8/1983 | Dawson et al. ............ | 166/294 |
| 4,916,012 | 4/1990 | Sawanobori et al. ............ | 428/367 |
| 5,032,181 | 7/1991 | Chung ............ | 106/717 |
| 5,147,565 | 9/1992 | Bour et al. ............ | 166/293 |
| 5,258,222 | 11/1993 | Crivelli ............ | 428/323 |
| 5,391,226 | 2/1995 | Frankowski ............ | 106/696 |
| 5,456,751 | 10/1995 | Zandi et al. ............ | 106/724 |
| 5,588,489 | 12/1996 | Chatterji et al. ............ | 166/293 |
| 5,696,059 | 12/1997 | Onan et al. ............ | 166/293 |

OTHER PUBLICATIONS

Publication entitled "*Rubber–Tire Particles As Concrete Aggregate*" by Neil Eldin et al published in the Journal of Materials In Civil Engineering, vol. 5, No. 4 pp. 479–496 Nov. 1993.

Publication entitled "*The Properties Of Rubberized Concretes*" by I. Topcu published in the Cement and Concrete Research Journal, vol. 25, No. 2 pp. 304–310 (1995) (no month).

Publication entitled "*Hot Alkali Carbonation of Sodium Metaphosphate Modified Fly Ash/Calcium Aluminate Blen Hydrothermal Cements*" by T. Sugama published in the Cement and Concrete Research Journal, vol. 26, No. 11. pp. 1661–1672 Sep. 1996.

Publication entitled "*Mullite Microsphere–Filled Lightweight Calcium Phosphate Cement Slurries for Geothermal Wells: Setting and Properties*" by T. Sugama, et al. published in the Cement and Concrete Research Journal, vol. 25, No. 6. pp. 1305–1310 Apr. 1995.

Publication entitled "*Carbonation of Hydrothermally Treated Phosphate–Bonded Calcium Aluminate Cements*" by T. Sugama, et al. published under the auspices of the U.S. Department of Energy, Washington, D.C. under contact No. DE–AC02–76CH00016; undated.

Publication entitled "*Lightweight $CO_2$–Resistant Cements for Geothermal Well Completions*", by Lawrence E. Kukacka, et al., publisher unkown and undated.

Publication entitled "*Microsphere–Filled Lightweight Calcium Phosphate Cements*", by Toshifumi Sugama, et al. under the auspices of the U.S. Department of Energy, Washington, D.C. under Contract No. DE–AC02–76CH00016; Dec. 1992.

Publication entitled "*Interfaces and Mechanical Behaviors of Fiber–Reinforced calcium Phosphate Cement Composites*", by T. Sugama, et al. prepared for the Geothermal Division U.S. Department of Energy; Department of Applied Science, Jun., 1992.

Publication entitled "*Calcium Phosphate Cements Prepared by Acid–Base Reaction*", by Toshifumi Sugama, et al. published in the Journal of the American Ceramic Society vol. 75, No. 8, p. 2076–2087 Aug. 1992.

*Primary Examiner*—Michael Marcheschi
*Attorney, Agent, or Firm*—Craig W. Roddy; C. Clark Dougherty, Jr.

[57] ABSTRACT

The present invention provides light weight high temperature well cement compositions and methods. The compositions are basically comprised of calcium phosphate cement, water, a foaming agent, a foam stabilizer and a gas present in an amount sufficient to form a foam having a density in the range from about 11.5 to about 15 pounds per gallon.

20 Claims, No Drawings

LIGHT WEIGHT HIGH TEMPERATURE WELL CEMENT COMPOSITIONS AND METHODS

BACKGROUND OF THE INVENTION

1. Field of the Invention

The present invention relates generally to light weight high temperature well cement compositions and methods, and more particularly, to such compositions and methods which are suitable for cementing high temperature wells containing carbon dioxide.

2. Description of the Prior Art

In the completion of high temperature subterranean wells containing carbon dioxide, eg., geothermal wells, the use of conventional hydraulic cement compositions often results in early well failure. Because of the high static well bore temperatures involved coupled with the presence of brines containing carbon dioxide, conventional hydraulic well cements rapidly deteriorate due to carbonation. In geothermal wells which typically involve very high temperatures, pressures and carbon dioxide concentrations, conventional well cement failures have occurred in less than five years causing the collapse of the well casing.

It has heretofore been discovered that a cement material known as calcium phosphate cement formed by an acid-base reaction between calcium aluminate and a phosphate-containing solution has high strength, low permeability and excellent carbon dioxide resistance when cured in hydrothermal environments. However, calcium phosphate cement has a relatively high density, eg., a density in the range of from about 15 to about 17 pounds per gallon, which is too high for geothermal applications. That is, in geothermal wells the hydrostatic pressure exerted by the high density calcium phosphate cement often exceeds the fracture gradients of subterranean zones penetrated by the well bore which causes the formation of fractures into which the cement is lost. While calcium phosphate cements have been developed which include hollow microspheres and as a result have densities of about 10 pounds per gallon, such light weight compositions are relatively expensive and the presence of the microspheres in the cured cement reduces its compressive strength.

Thus, there is a need for an improved light weight well cement composition useful in cementing high temperature wells containing carbon dioxide.

SUMMARY OF THE INVENTION

The present invention provides cement compositions and methods which meet the needs described above and overcome the deficiencies of the prior art. The compositions are particularly useful in high temperature wells containing carbon dioxide such as geothermal wells. The compositions are basically comprised of calcium aluminate, sodium polyphosphate, fly ash, sufficient water to form a pumpable slurry, an alpha-olefinic sulfonate foaming agent, a betaine foam stabilizer and a gas present in an amount sufficient to form a foam having a density in the range of from about 11.5 to about 14 pounds per gallon.

The methods of the present invention for cementing a high temperature subterranean zone containing carbon dioxide penetrated by a well bore basically comprise the steps of forming a light weight foamed well cement composition of this invention, pumping the cement composition into the subterranean zone by way of the well bore and allowing the cement composition to set into a hard impermeable mass therein.

It is, therefore, a general object of the present invention to provide light weight high temperature well cement compositions and methods.

Other and further objects, features and advantages of the present invention will be readily apparent to those skilled in the art upon a reading of the description of preferred embodiments which follows.

DESCRIPTION OF PREFERRED EMBODIMENTS

As mentioned above, high temperature wells containing carbon dioxide such as geothermal wells generally require the use of light weight well cement compositions which do not deteriorate in the presence of carbon dioxide containing brines. The term "high temperature" is used herein to mean wells wherein the static bottom hole temperature is above about 300° F. up to as high as about 600° F. When conventional hydraulic cements are utilized in such wells, carbonation causes dissolution of the cement which is converted into water-soluble salts. Further, severe corrosion of steel pipe takes place thereby resulting in the total disruption of the conventional cement supported well structure.

When conventional normal density cement slurries are utilized in geothermal and other similar wells, loss of circulation problems are often encountered. This is due to the weak unconsolidated formations in the wells having very low fracture gradients. When a relatively high density cement slurry is pumped into such a well, the hydrostatic pressure exerted on the weak unconsolidated subterranean zones therein causes the zones to fracture. This in turn causes the cement slurry being pumped to enter the fractures and lost circulation problems to occur. To avoid such problems, the cement compositions utilized in geothermal and other similar wells must be of light weight, i.e., have densities in the range of from about 11 to about 15 pounds per gallon.

By the present invention, light weight high temperature well cement compositions are provided which resist high temperature carbonation deterioration. The compositions are basically comprised of a foamed calcium phosphate cement comprised of calcium aluminate, sodium polyphosphate, fly ash, sufficient water to form a pumpable slurry, a foaming agent, a foam stabilizer and a gas present in an amount sufficient to form a foam having a density in the range of from about 12 to about 14 pounds per gallon.

The calcium aluminate can be any commercial grade calcium aluminate suitable for use as a cement. A suitable such calcium aluminate is commercially available from the Lehigh Portland Cement Company of Allentown, Pennsylvania under the trade designation "REFCON™." The calcium aluminate is generally included in the cement composition in an amount in the range of from about 15% to about 40% by weight of the composition.

The sodium polyphosphate includes sodium metaphosphate and sodium triphosphate as well as vitreous sodium phosphates. A suitable sodium polyphosphate for use in accordance with the present invention is commercially available from Calgon Corporation of Pittsburgh, Pa. The sodium polyphosphate is generally included in the cement composition in an amount in the range of from about 5% to about 20% by weight of the composition.

Fly ash is the finally divided residue that results from the combustion of ground or powdered coal and is carried by the flue gases generated. The particular fly ash that is useful in accordance with the present invention is a fine particle size ASTM class F fly ash having a Blaine fineness of about 10,585 square centimeters per gram which is commercially available from LaFarge Corporation of Michigan under the trade designation "POZMIX™". The fly ash functions as a light weight filler and is generally included in the composition in an amount in the range from about 25% to about 45% by weight of the composition.

The water utilized can be from any source provided it does not contain an excess of compounds that adversely affect other compounds in the cement composition. For example, the water can be fresh water or saltwater. Generally, the water is present in the cement composition in an amount sufficient to form a pumpable slurry, i.e., an amount in the range of from about 20% to about 35% by weight of the composition.

In order to facilitate the foaming of the cement composition, a foaming agent is included in the composition.

A particularly suitable and preferred such foaming agent is an alpha-olefinic sulfonate having the formula

$$H(CH_2)_n\text{—}CH\text{=}CH\text{—}(CH_2)_m SO_3 Na$$

wherein n and m are individually integers in the range of from about 6 to about 16. The foaming agent is generally included in the cement composition in an amount in the range of from about 1% to about 3% by weight of the composition. The most preferred foaming agent of this type is an alpha-olefinic sulfonate having the above formula wherein n and m are each 16, i.e., a sulfonic acid alkane sodium salt.

A foam stabilizer is also included in the cement composition to enhance the stability of the composition after it is foamed. A particularly suitable and preferred stabilizing agent is an amidopropylbetaine having the formula

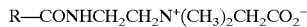
$$R\text{—}CONHCH_2CH_2N^+(CH_3)_2CH_2CO_2^-$$

wherein R is a radical selected from the group of decyl, cetyl, oleyl, lauryl and cocoyl. The foam stabilizer is generally included in the cement composition in an amount in the range of from about 0.5% to about 1.5% by weight of the composition. The most preferred foam stabilizer of this type is cocoylamidopropylbetaine.

The gas utilized to foam the composition can be air or nitrogen, with nitrogen being the most preferred. The amount of gas present in the cement composition is that amount which is sufficient to form a foam having a density in the range of from about 11.5 to about 15 pounds per gallon, most preferably 12 pounds per gallon.

In order to provide resiliency to the set cement composition of this invention, the composition may optionally include inert ground rubber particles. Such particles are produced from tires, such as automobile tires, and are commercially available from Four D Corporation of Duncan, Okla.

At static well bore temperatures above about 125° F., a set retarder is required. The set retarder functions to lengthen the time in which the cement composition starts to thicken and set so that the composition can be pumped into the well bore and into the zone to be cemented before such thickening takes place. Preferred such set retarders for use in accordance with this invention are gluconic acid and citric acid. When used, the set retarder is included in the cement composition in an amount in the range of from about 0.5% to about 2% by weight of the composition.

A particularly preferred composition of the present invention is comprised of calcium aluminate present in an amount of about 28% by weight of the composition, sodium polyphosphate present in an amount of about 19% by weight of the composition, ASTM class F Fly Ash present in an amount of about 49% by weight of the composition, sufficient water to form a pumpable slurry, a foaming agent comprising a sulfonic acid $C_{16\text{-}16}$ alkane sodium salt present in an amount of about 3% by weight of the composition, a foam stabilizer comprising cocoylamidopropylbetaine present in an amount of about 1% by weight of the composition and a gas present in an amount sufficient to form a foam having a density of about 12.5 pounds per gallon.

As previously mentioned, the cement composition can include ground rubber particles present in an amount in the range of from about 10% to about 40% by weight of the composition to improve the resiliency of the composition. Further, when the static well bore temperature is above about 125° F., a set retarder selected from the group of gluconic acid and citric acid is included in the cement composition in an amount of about 1.0% by weight of the composition.

The foamed cement compositions of this invention may be prepared in accordance with any of the mixing techniques utilized in the art. In one preferred method, a quantity of water is introduced into a cement blender followed by the calcium aluminate, sodium polyphosphate and fly ash. The mixture is agitated for a sufficient period of time to form a pumpable non-foamed slurry. The slurry is then pumped to the well bore and the alpha-olefinic sulfonate foaming agent and betaine foam stabilizer followed by the gas utilized are injected into the slurry on the fly. As the slurry and gas flow through the well bore to the location where the resulting foamed cement composition is to be placed, the cement composition is foamed and stabilized. Other liquid additives utilized, if any, are added to the water prior to when the components of the calcium phosphate cement are mixed therewith and other dry solids, if any, are added to the water and cement prior to mixing.

The methods of this invention of cementing a high temperature subterranean zone containing carbon dioxide penetrated by a well bore are basically comprised of the steps of forming a foamed cement composition of this invention, pumping the foamed cement composition into the subterranean zone to be cemented by way of the well bore and then allowing the foamed cement composition to set into a hard impermeable mass therein.

In order to further illustrate the improved cement compositions and methods of this invention, the following examples are given

EXAMPLE 1

In a controlled test, API class G Portland Cement was mixed with 40% silica flour and water to form a cement slurry. The slurry was allowed to set for 24 hours at a temperature of 190° F. Thereafter, the set cement was placed in an aqueous 4% by weight sodium carbonate solution for 28 days at 600° F.

A calcium phosphate cement composition was prepared comprised of 23.3% water; 17.5% calcium aluminate; 15.6% sodium polyphosphate; 40.8% ASTM class F fly ash, 1.9%; sulfonic acid alkane sodium salt foaming agent and 0.9% cocoylamidopropylbetaine foam stabilizer, all by weight of the composition. After mixing, the resulting slurry was allowed to set for 24 hours at a temperature of 190° F. Thereafter, the set calcium phosphate cement was placed in a 4% by weight aqueous sodium carbonate solution for 28 days at 600° F.

At the end of the test periods, samples from the interiors of the set Portland Cement composition and calcium phosphate cement composition were tested. The tests showed that the Portland Cement composition contained 1.5% by weight calcium carbonate and the calcium phosphate cement contained none. Samples were also tested taken from the exteriors of the set cements which showed that the Portland cement composition contained 10.6% calcium carbonate while the calcium phosphate cement contained none.

EXAMPLE 2

Test calcium phosphate cement slurry samples were prepared by mixing 240 grams of water with 180 grams of calcium aluminate, 160 grams of sodium polyphosphate and 420 grams of fly ash for each sample. Various Portland cement set retarding additives were combined with the test samples.

After mixing, each test sample was tested for thickening time at 125° F. in accordance with the test procedure set forth in *API Specification For Materials And Testing For Well Cement, API Specification* 10, Fifth ed., dated Jul. 1, 1990 of the American Petroleum Institute. The set retarders tested are identified and the thickening time test results are set forth in Table I below.

TABLE I

THICKENING TIME TESTS[1]

| Set Retarder Tested | Amount Added to Test Sample, grams | Thickening Time, hrs.:mins. |
| --- | --- | --- |
| None | — | 1:35 |
| Acrylic Acid Polymer | 6 | 2:02 |
| Tartaric Acid | 6 | 1:12 |
| Gluconic Acid | 6 | 4:05 |
| Citric Acid | 6 | 6:00+ |

[1]API Tests at 125° F.

From Table I, it can be seen that gluconic acid and citric acid are the most effective set retarders for the calcium phosphate cement composition at a temperature of 125° F.

EXAMPLE 3

Two additional calcium phosphate cement slurry samples were prepared as shown in Table II below. After mixing, the resulting slurries were allowed to set for 24 hours at 190° F. Thereafter, the set samples were placed in 4% by weight aqueous sodium carbonate solutions for 28 days at 600° F. At the end of the 28 day periods, the samples were tested for compressive strengths in accordance with the above mentioned *API Specification* 10. The results of the tests are also set forth in Table II below.

From Table II, it can be seen that the light weight calcium phosphate cement compositions of the present invention maintained their compressive strengths after 28 days in the presence of sodium carbonate solutions at 600° F.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A light weight well cement composition useful in cementing high temperature wells containing carbon dioxide comprising:

calcium aluminate present in an amount in the range of from about 15% to about 40% by weight of said composition;

sodium polyphosphate present in an amount in the range from about 5% to about 20% by weight of said composition;

fly ash present in an amount in the range of from about 25% to about 45% by weight of said composition;

sufficient water to form a pumpable slurry;

a foaming agent comprising an alpha-olefinic sulfonate having the formula $$H(CH_2)_n-CH=CH-(CH_2)_mSO_3Na$$

wherein n and m are integers in the range of from about 6 to about 16, said foaming agent being present in an amount in the range of from about 1% to about 3% by weight of said composition;

a foam stabilizer comprising a betaine having the formula $$R-CONHCH_2CH_2N^+(CH_3)_2CH_2CO_2$$

wherein R is a radical selected from decyl, cetyl, oleyl, lauryl or cocoyl, said from stabilizer being present in an amount in the range of from about 0.5% to about 1.5% by weight of said composition; and a gas present in an amount sufficient to form a foam having a density in the range of from about 11.5 to about 15 pounds per gallon.

2. The composition of claim 1 wherein said water is selected from fresh water or saltwater.

3. The composition of claim 1 wherein said water is present in said composition in an amount in the range of from about 20% to about 35% by weight of said composition.

TABLE II

Compressive Strength Tests

| | Sample Components, grams | | | | | | Compressive |
| --- | --- | --- | --- | --- | --- | --- | --- |
| Sample No. | Water | Calcium Aluminate[1] | Sodium Phosphate[2] | Fly Ash[3] | Foaming Agent[4] | Foam Stabilizer[5] | Density lb/gal. | Strength, psi |
| 1 | 465.5 | 350 | 311.5 | 815.5 | 37.3 | 18.6 | 12.1 | 570 |
| 2 | 266 | 200 | 178 | 466 | 21.3 | 10.6 | 15.1 | 1060 |

[1]"REFCON ™" from Lehigh Portland Cement Co.
[2]Calgon Sodium Polyphosphate
[3]ASTM Class F fly ash from LaFarge Corp.
[4]Sulfonic acid $C_{16-16}$ alkane sodium salt
[5]Cocoylamidopropylbetaine 4. The composition of claim 1 wherein said alpha-olefinic sulfonate is sulfonic acid alkane sodium salt.

5. The composition of claim 1 wherein said betaine is cocoylamidopropylbetaine.

6. The composition of claim 1 further comprising ground rubber particles present in an amount in the range of from about 10% to about 40% by weight of said composition.

7. The composition of claim 1 further comprising a set retarder selected from gluconic acid or citric acid.

8. A light weight well cement composition useful in cementing high temperature wells containing carbon dioxide comprising:

calcium aluminate present in an amount of about 28% by weight of said composition;

sodium polyphosphate present in an amount of about 19% by weight of said composition;

ASTM class F fly ash present in an amount of about 49% by weight of said composition;

sufficient water to form a pumpable slurry;

a foaming agent comprising a sulfonic acid alkane sodium salt present in an amount of about 3% by weight of said composition;

a foam stabilizer comprising cocoylamidopropylbetaine present in an amount of about 1% by weight of said composition; and a gas present in an amount sufficient to form a foam having a density of about 12.5 pounds per gallon.

9. The composition of claim 8 further comprising ground rubber particles present in an amount in the range of from about 10% to about 40% by weight of said composition.

10. The composition of claim 9 further comprising a set retarder selected from gluconic acid or citric acid.

11. A method of cementing a high temperature subterranean zone containing carbon dioxide penetrated by a well bore comprising the steps of:

(a) forming a light weight well cement composition comprised of calcium aluminate, sodium polyphosphate, fly ash, sufficient water to form a pumpable slurry, a foaming agent comprising an alpha-olefinic sulfonate having the formula

H(CH$_2$)$_n$—CH=CH—(CH$_2$)$_m$SO$_3$Na wherein n and m are integers in the range of from about 6 to about 16, a foam stabilizer comprising a betaine having the formula

R—CONHCH$_2$CH$_2$N$^+$(CH$_3$)$_2$CH$_2$CO$_2^-$ wherein R is a radical selected from decyl, cetyl, oleyl, lauryl or cocoyl and a gas present in an amount sufficient to form a foam having a density in the range from about 11.5 to about 15 pounds per gallon;

(b) pumping said cement composition into said subterranean zone by way of said well bore; and (c) allowing said cement composition to set into a hard impermeable mass.

12. The method of claim 11 wherein said water is selected from fresh water or saltwater.

13. The method of claim 11 wherein said alpha-olefinic sulfonate is a sulfonic acid alkane sodium salt.

14. The method of claim 11 wherein said alpha-olefinic sulfonate is present in said composition in an amount in the range of from about 1% to about 3% by weight of said composition.

15. The method of claim 11 wherein said betaine is cocoylamidopropylbetaine.

16. The method of claim 11 wherein said betaine is present in said composition in an amount in the range of from about 0.5% to about 1.5% by weight of said composition.

17. The method of claim 11 wherein said calcium aluminate is present in said composition in an amount in the range of from about 15% to about 40% by weight of said composition.

18. The method of claim 11 wherein said sodium polyphosphate is present in said composition in an amount in the range of from about 5% to about 20% by weight of said composition.

19. The method of claim 11 wherein said fly ash is present in said composition in an amount in the range of from about 25% to about 45% by weight of said composition.

20. The method of claim 11 wherein said composition further comprises ground rubber particles present in an amount in the range of from about 10% to about 40% by weight of said composition.

* * * * *